Patented Aug. 16, 1949

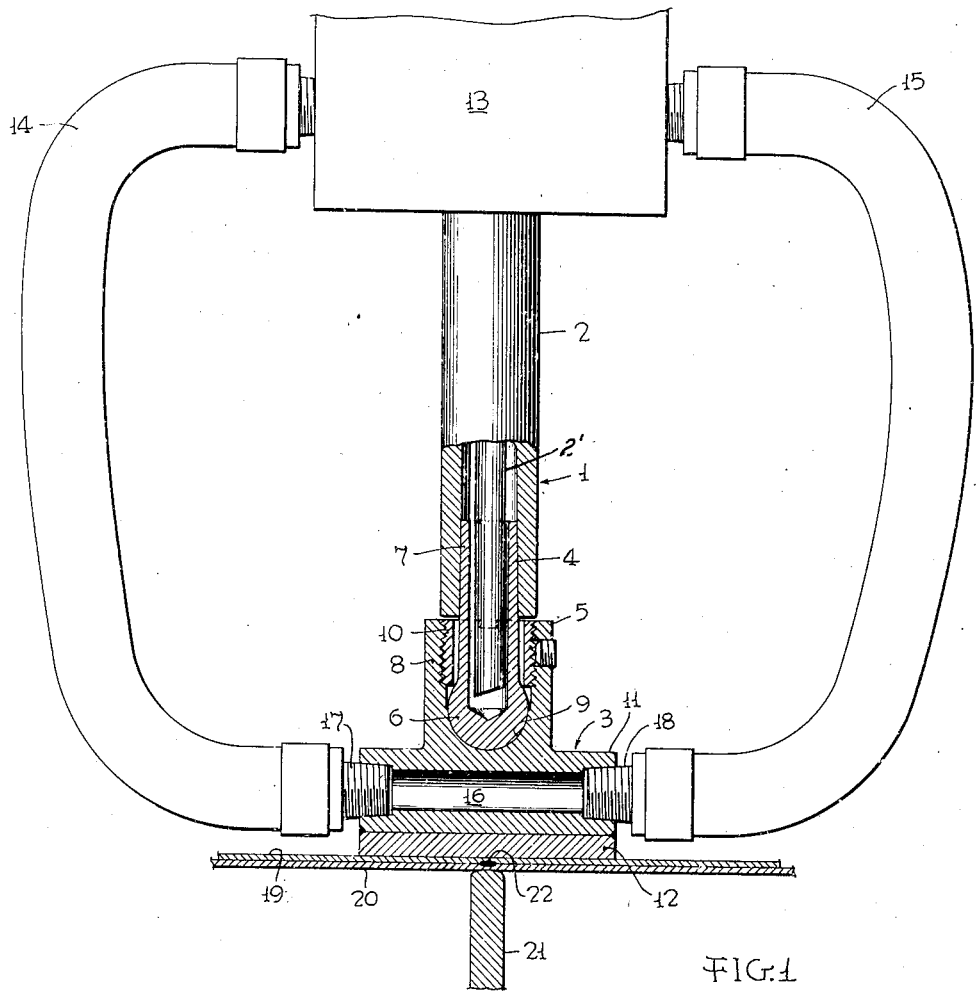
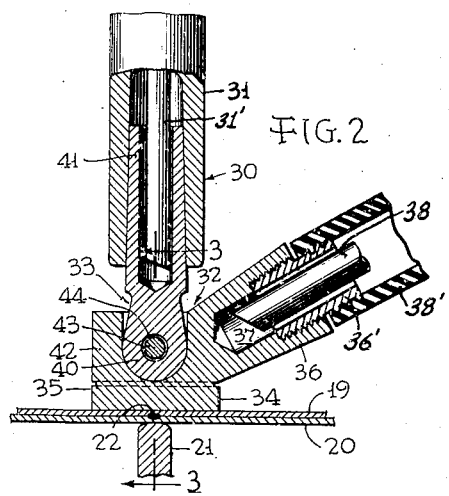
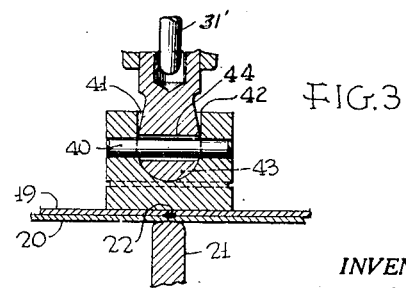

2,479,547

UNITED STATES PATENT OFFICE 2,479,547

ADJUSTABLE TIP FOR RESISTANCE WELDING ELECTRODES

Clarence F. Wersler and Joseph F. Bukowski, Philadelphia, Pa., assignors to The Budd Company, Philadelphia, Pa., a corporation of Pennsylvania Application October 2, 1946, Serial No. 700,778

3 Claims. (Cl. 219—4)

This invention relates to welding electrodes for resistance welders.

In welding operations where welds are being applied to metal sheets having a finished surface, the problem arises of preventing the finished surface from being marred by the mechanical pressure between the electrodes, as well as by the high temperatures which are involved in the welding operation.

It is a primary object of the present invention to provide an electrode which may be utilized in resistance welding without marring the finished surface of the workpiece to which the weld is applied.

Another object of the invention is to provide an electrode which distributes the pressure of the electrode over a substantial surface around the weld point, tending to prevent indentation of the workpiece in the areas external to the weld.

Another object of the invention is to provide an electrode which reduces the density of electrical current utilized in the welding operation at the finished surface of the workpiece sheet or plate so as to reduce marring of the finish from overheating.

Still another object of the invention is to provide an electrode having a tip which automatically adjusts itself to the workpiece surface.

An object of the invention also is to provide an electrode with a modified universal joint, with accessory means for preventing oxidation of the joint surfaces and resulting electrical inefficiency.

A related object is to provide an electrode tip having direct cooling means for reducing the heat transfer to the electrode holder.

Referring to the drawings:

Figure 1 is a view of one form of the electrodes for accomplishing the objects of the invention;

Figure 2 is a view of a modification of the electrodes, with parts in section; and Figure 3 is a detail showing the joint connection of the modification of Figure 2.

In Figure 1 the upper electrode is indicated by the numeral 1 and is formed of a holder 2 and a tip 3, with a joining connection including the ball coupling 4 and socket coupling 5. The holder 2 is tubular in construction to permit passage of coolant. The ball coupling 4 consisting of a ball head 6 and a shaft 7 is also tubular, and when the shaft 7 is inserted in the hollow end of the holder 2 coolant may penetrate within the ball coupling to the interior of the ball 6. An inner supply tube 2' is provided within tube 2 as is usual.

The socket coupling 5 includes the shell 8 provided with a recess 9 having a spherical surface for cooperative engagement with the ball 6 of the ball coupling 4. The throat of the recess is sufficiently large to permit insertion of a threaded sleeve 10 with space between the sleeve and shaft 7 for limited universal movement of the shaft. The inner diameter of the sleeve 10 is less than that of the ball 6 to hold the ball in place in the socket.

The electrode tip 3 is formed of two flat plates 11 and 12 welded together and attached to the socket shell in extension of and transversely to the holder axis. Plate 11 is shown integral with the socket shell, anad plate 12 is welded to plate 11. Plate 11, socket shell 8 and holder 2 are preferably of copper, while plate 12 is of alloy, such as that of copper and nickel, capable of withstanding the high temperatures and pressures involved in resistance welding. The tip plates may be circular or of any desired shape.

Coolant is supplied directly to the tip from a drum 13 and flexible conduits 14 and 15. A transverse aperture 16 is formed through the plate 11 of the tip, and at the end openings couplings 17 and 18 are attached to which the conduits 14 and 15 are connected. A steady flow of coolant is maintained through the tip aperture during welding operations. Coolant is also passed through the holder 2 and ball coupling 4, as previously indicated.

Cooperating with the electrode 1 and positioned axially in extension thereof for cooperative action on the workpiece plates 19 and 20 is the lower electrode 21. The nugget 22 between the electrodes at the interface between the workpiece plates is indicative of the type of weld secured by the electrodes.

From the above description it is apparent that a limited universal connection is provided between the holder 2 and the tip 3 so that the tip may accommodate itself to a limited extent in any direction of pressure to the surface of the workpiece. Accordingly, on account of the enlarged surface of the tip which bears on the workpiece, pressure on the workpiece is equalized and the current density at the contacting surface with the tip is diminished to a point where injury to the finish is eliminated. In addition, it is now clear that the coolant penetrating the aperture 16 in the tip is made effective on the bearing surfaces of the ball aand socket joint so that oxidation on these surfaces is prevented, with consequent maintenance of high electrical conduction and efficiency. The presence of the coolant in the tip also prevents overheating of the alloy plate 12 in cooperation with the extended area of contact, thus aiding in the prevention of mar to the finished surface of the workpiece.

The modification of Figure 1 is useful particularly where pressures are vertical. In Figures 2 and 3 we have shown a modification which is efficiently usable not only in a vertical position, but in horizontal and other positions. In this form of the invention the upper electrode 30 includes a holder 31, a tip member 32, and a coupling member 33. The holder 31 is tubular and has an inner supply tube 31', similar to the holder 2 of Figure 1. The tip 32 of the modification is provided with a special alloy contact plate 34, similar to the plate 12 of Figure 1. The tip element 35, however, includes a coolant coupling connection 36 extending at an angle on one side of the tip member 35. This coupling is hollow, as at 37, for entrance of the coolant and is interiorly screw threaded adjacent the end thereof to receive a flexible hose connector (not shown) for removal of coolant. Supply of coolant is by means of the tube 38 which penetrates the cavity 37 in the coupling 36, an outer tube 38' connected to a nipple 36' carrying coolant away.

Connection between the electrode holder 31 and the tip element 35 is by means of the coupling member 33. This member includes a ball 40 connected to the holder 31 by a hollow shaft 41, and a socket 42 having a curved recess corresponding in curvature to the ball surface. A pin 43 is fixed to the socket so as to extend transversely across the recess, and this pin is adapted to penetrate an aperture 44 formed transversely in the coupling ball 40. The aperture diameter is in excess of that of the pin 43, as shown in Figures 2 and 3, so that a limited pivotal movement between ball and socket is permitted in the plane including the pin and holder. At right angles to this plane the ball may move to the limit of the socket recess wall. In this manner a limited universal connection between the ball and socket is obtained.

The modification of Figures 2 and 3 has been found to be particularly useful in applying welds to surfaces at any angle of engagement. Inspection of these Figures makes clear that the bearing surface of the ball and socket joint is geometrically centered in the tip, and consequently it would be expected that it is approximately at the center of mass. Because of this positional relationship, when the tube is held with the holder horizontal, for example, and applied against a vertical workpiece, the tendency of the tip to pivot on the joint is very substantially reduced, if not eliminated. This is important for welding operations on vertical workpieces since if the pivot point is moved from the center of mass of the tip to a point where horizontal holding of the electrode will cause pivoting of the tip with the upper edge leading, on pressure of the electrode against the workpiece this upper edge will engage the workpiece and gouge the surface thus destroying the appearance of the finish and moreover tending to bend the upper electrode out of alignment with the lower electrode, resulting in inferior welds. The electrode arrangement of Figure 1 may not satisfactorily be used for vertical operations on account of this pivoting action. Placement of the coolant coupling connection 36 at an angle with the bearing surface of the tip with a substantial mass thereof off center also contributes to maintenance of the bearing surface of the tip in a substantially vertical plane transverse to the axis of the electrode holder.

In addition, the effective cooling of the tip wherein the heat withdrawal from the tip is directly through the solid metal to the coolant insures maintenance of low temperature at the coupling surfaces so that, in conjunction with the cooling of the electrode holder 31 and the coupling 33, oxidation of the coupling surfaces, with resultant early destruction of electrode usefulness, is prevented.

Exemplary forms of the invention have been described, but it is apparent that modifications may be made to fit specific needs, the scope of the invention being determined by the claims as hereto appended.

What is claimed is:

1. An electrode for resistance welding apparatus comprising a tubular holder, a tip having a workpiece-engaging surface and a coolant coupling, and coupling means for establishing a universal joint between the holder and tip, said coupling means comprising a shaft fixed to said holder, a curved head fixed to said shaft and adapted to engage a recess formed in said tip having a cooperating interior surface curvature, an aperture formed through said head at right angles to the holder axis, and a pin fixed to the tip and penetrating said head aperture, the diameter of the head aperture being greater than that of the pin.

2. An electrode for resistance welding apparatus comprising a holder, a tip having a workpiece-engaging surface, and coupling means for establishing a universal joint between cooperating parts of the holder and tip, said coupling means comprising a ball on one part having a transverse opening therethrough, a socket on the other part adapted to receive said ball and a pivot pin supported by the part having said socket, said pin passing through said ball opening, said opening having a transverse area larger than that of the pin whereby limited universal relative movement of the ball and socket parts is obtained.

3. An electrode for resistance welding apparatus comprising a holder, a tip having a workpiece-engaging surface, and coupling means for establishing a universal joint between the cooperating parts comprising the holder and tip, said coupling means comprising a pivot pin fixed to one of said parts and disposed in a recess in the other said part, said pin being undersized in diameter relative to the diameter of the recess whereby limited universal relative movement of the pin and holder is secured.

CLARENCE F. WERSLER.
JOSEPH F. BUKOWSKI.

REFERENCES CITED

The following references are of record in the file of this patent:

UNITED STATES PATENTS

| Number | Name | Date |
| --- | --- | --- |
| 935,346 | Winfield | Sept. 28, 1909 |
| 1,861,970 | Meadowcroft | June 7, 1932 |
| 1,992,990 | Burns | Mar. 5, 1935 |
| 2,179,693 | Goldstein | Nov. 14, 1939 |
| 2,260,866 | Powell | Oct. 28, 1941 |
| 2,315,854 | Holt | Apr. 6, 1943 |
| 2,346,088 | Shobert | Apr. 4, 1944 |